United States Patent [19]

Shirasaka

[11] Patent Number: 5,838,298
[45] Date of Patent: Nov. 17, 1998

[54] IMAGE PROCESSING APPARATUS AND METHOD FOR SMOOTHING STAIRWAY-LIKE PORTIONS OF A CONTOUR LINE OF AN IMAGE

[75] Inventor: Akifumi Shirasaka, Yokohama, Japan

[73] Assignee: Canon Kabushiki Kaisha, Tokyo, Japan

[21] Appl. No.: 250,944

[22] Filed: May 31, 1994

Related U.S. Application Data

[63] Continuation of Ser. No. 825,769, Jan. 21, 1992, abandoned, which is a continuation of Ser. No. 492,439, Mar. 14, 1990, abandoned, which is a continuation of Ser. No. 151,298, Feb. 1, 1988, abandoned.

[30] Foreign Application Priority Data

Feb. 13, 1987  [JP]  Japan ..................................... 62-31194
Feb. 19, 1987  [JP]  Japan ..................................... 62-36144

[51] Int. Cl.⁶ ..................................................... G09G 5/28
[52] U.S. Cl. ........................... 345/136; 345/509; 382/269
[58] Field of Search ..................................... 345/136, 192, 345/137, 194, 138, 508, 141, 509, 143, 144, 147, 149; 382/269

[56] References Cited

U.S. PATENT DOCUMENTS

| | | | |
|---|---|---|---|
| 3,680,076 | 7/1972 | Duffek et al. ............................ | 345/141 |
| 3,921,164 | 11/1975 | Anderson ................................ | 345/132 |
| 3,969,716 | 7/1976 | Roberts .................................... | 340/728 |
| 4,079,367 | 3/1978 | Yonezawa et al. ..................... | 340/728 |
| 4,127,850 | 11/1978 | Vallins .................................... | 340/728 |
| 4,331,955 | 5/1982 | Hansen .................................... | 340/728 |
| 4,371,872 | 2/1983 | Rossman ................................. | 340/728 |
| 4,466,123 | 8/1984 | Arai et al. ............................... | 382/267 |
| 4,486,785 | 12/1984 | Lasher et al. ........................... | 340/728 |
| 4,544,922 | 10/1985 | Watanabe et al. ...................... | 340/728 |
| 4,586,037 | 4/1986 | Rosener et al. ........................ | 340/728 |
| 4,591,844 | 5/1986 | Hickin et al. ........................... | 340/728 |
| 4,612,540 | 9/1986 | Pratt ........................................ | 340/728 |
| 4,679,039 | 7/1987 | Neil et al. ............................... | 340/747 |
| 4,780,711 | 10/1988 | Doumas .................................. | 340/728 |
| 4,796,016 | 1/1989 | Clark ....................................... | 340/728 |
| 4,808,984 | 2/1989 | Trueblood et al. ..................... | 340/728 |
| 4,849,746 | 7/1989 | Dubner ................................... | 340/728 |

Primary Examiner—Lun-Yi Lao
Attorney, Agent, or Firm—Fitzpatrick, Cella, Harper & Scinto

[57] ABSTRACT

An image processing apparatus for smoothly drawing and outputting a contour line of a graphic image includes: an input device to input an image; a memory to store the image input by the input device; a detecting circuit to detect a stairway-like change portion in the contour line image of the image stored in the memory a contour line correcting circuit to perform the smoothing process by forming notches in the stairway-like change portions of the contour line image detected by the detecting circuit; and a display device to display the image. The contour line correcting circuit inverts the stairway-like change portions of the contour line image detected by the detecting circuit, thereby forming the notches and executing the smoothing process. The detecting circuit detects the stairway-like change portions of the contour line image having slopes of a predetermined angle or more with respect to the horizontal or vertical direction in the image stored in the memory. With this apparatus, the visually smooth image is derived without performing a complicated control operation.

19 Claims, 6 Drawing Sheets

IMAGE PROCESSING APPARATUS AND METHOD FOR SMOOTHING STAIRWAY-LIKE PORTIONS OF A CONTOUR LINE OF AN IMAGE

This application is a continuation of application Ser. No. 07/825,769, filed Jan. 21, 1992, now abandoned, which was a continuation of application Ser. No. 07/492,439, filed Mar. 14, 1990, now abandoned, which was a continuation of application Ser. No. 07/151,298, filed Feb. 1, 1988, now abandoned.

BACKGROUND OF THE INVENTION

1. Field of the Invention

The present invention relates to an image processing apparatus and, more particularly, to an image processing apparatus for smoothly drawing and outputting contour lines of a graphic image.

2. Related Background Art

Conventional image processing apparatus employ, a method of visually smoothing stairway-like notches in a graphic image having contour lines of gentle slopes and horizontal and vertical lines which is displayed as dots by a display apparatus or the like. In one such technique, for example, stairway-like notches as shown in FIG. 12(b) are smoothed as shown in FIG. 12(a) by use of the luminance modulation.

However, the above technique use in conventional image processing apparatus has the drawback that a complicated interface is needed between an output apparatus having a complicated control mechanism and a main control unit.

SUMMARY OF THE INVENTION

It is an object of the present invention to provide an image processing apparatus in which when contour lines of a graphic image are drawn in a memory in accordance with the coordinate values of the contour lines, the stairway-like change portions are detected and these stairway-like change portions are notched, thereby visually smoothing the contour lines.

Another object of the invention is to provide an image processing apparatus in which when contour lines of a graphic image are drawn in a memory in accordance with the coordinate values of the contour lines, only the contour lines having slopes with respect to the horizontal and vertical lines are detected and these contour lines are shifted upward/downward or to the right/left by a few dots, and notches are formed in the stairway-like change portions of the contour lines, thereby visually smoothing the contour lines.

Still another object of the invention is to provide an image processing apparatus in which the contour lines of a graphic image having gentle slopes are visually smoothly output without performing a complicated control operation in an output apparatus.

DETAILED DESCRIPTION OF THE PREFERRED EMBODIMENTS (First embodiment)

An embodiment of the present invention will be described hereinbelow with reference to the drawings.

Figure 1:
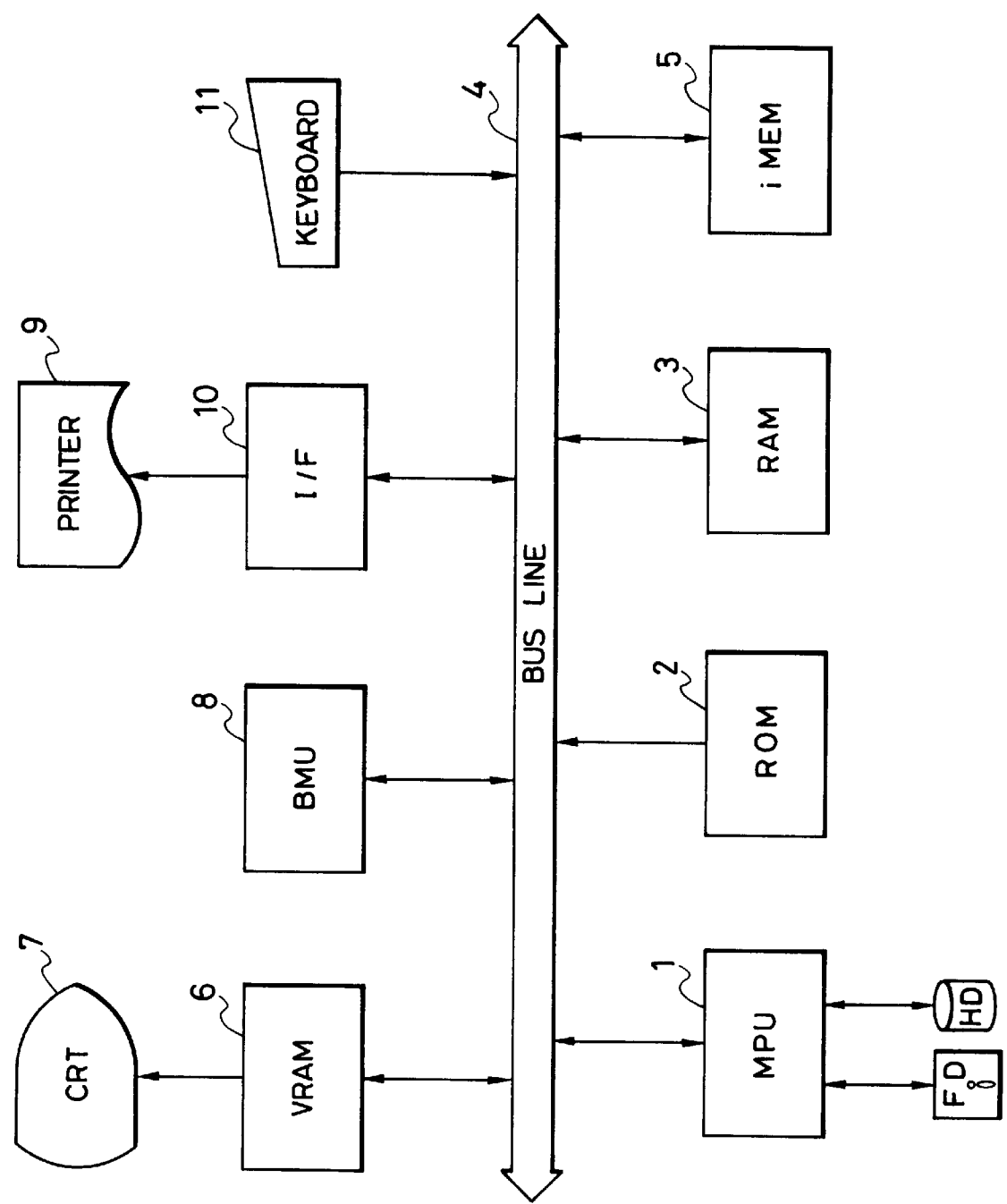
FIG. 1 is a block diagram showing the constitution of an image processing apparatus of the present invention.
Figure 2:
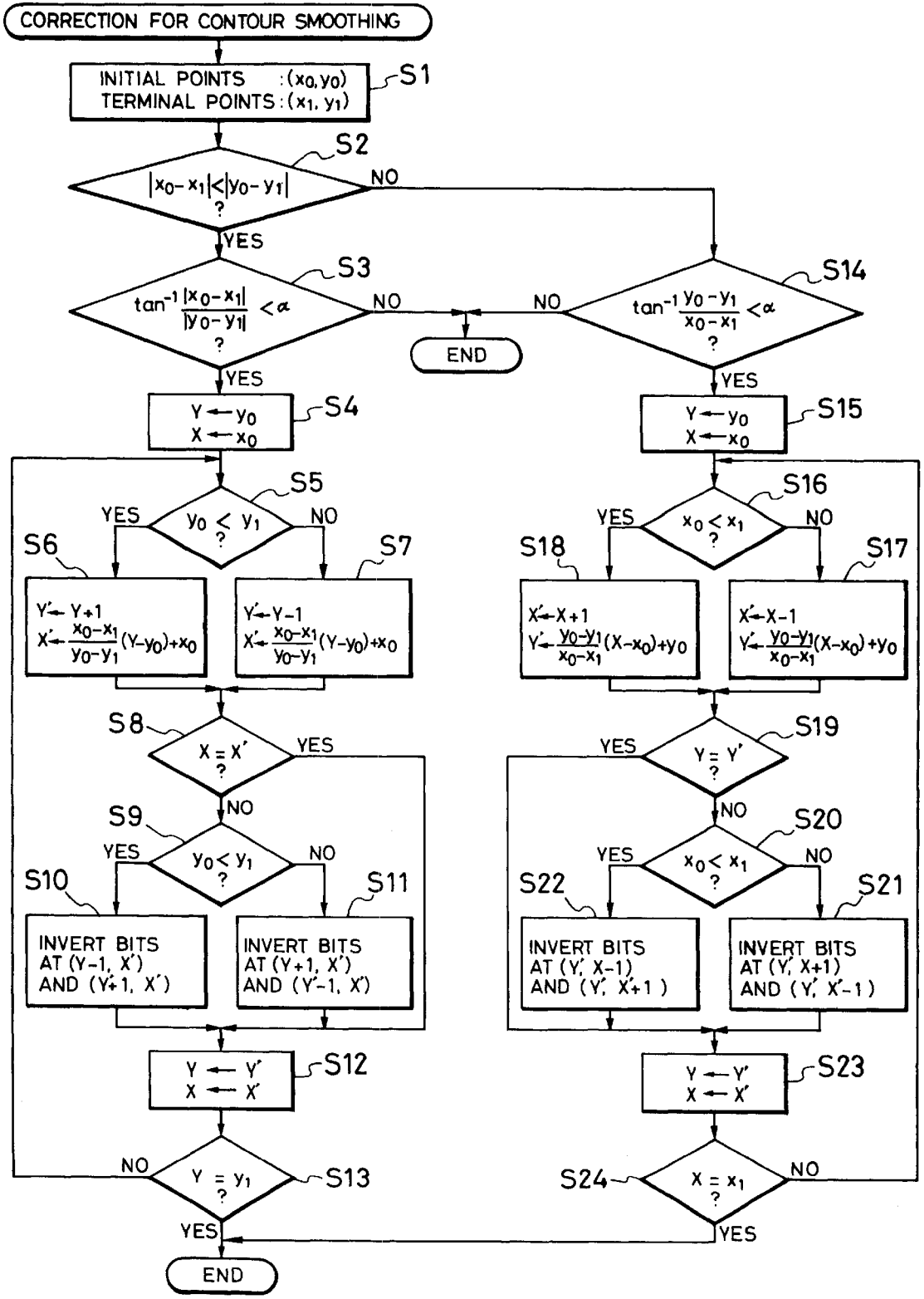
FIG. 2 is a flowchart showing an algorithm for processes to smooth and correct contour lines according to the first embodiment.

FIG. 1 shows the constitution of an image processing apparatus of the invention. Reference numeral 1 denotes a main control unit MPU to control the whole image processing apparatus. The MPU 1 executes processes to smooth and correct contour lines in accordance with a flowchart in FIG. 2, which will be explained hereinafter. An external memory device such as floppy disc (FD), hard disc (HD), or the like is connected to the MPU 1. Numeral 2 denotes a ROM (read only memory) in which various kinds of control programs of the MPU 1 and a program for processes to smooth contour lines shown in FIG. 2 are stored. Numeral 3 denotes a RAM (random access memory) to temporarily store character data and other various kinds of data which are input from the outside through a bus line 4. Image data is stored into an image memory (IMEM) 5. Dot planes, which will be explained hereinafter, can be developed in the RAM 3 and IMEM 5. Numeral 6 denotes a video memory (VRAM). Data to be displayed by a CRT display unit 7 is developed in a dot map in the video memory 6. For example, in the case of character data, the characters corresponding to the codes of the character data are developed in the VRAM. A cursor can be directly generated and displayed in the display area of the VRAM by the control of the MPU 1. A BMU (bit manipulation unit) 8 has a DMA (direct memory access) function in which data can be transferred among input and output apparatuses of the RAM 3, IMEM 5, VRAM 6, the printer, and the like without using the MPU 1. Numeral 9 denotes a printer; 10 is an interface to connect the printer 9 with the bus line 4; and 11 is a keyboard which can input various kinds of data and commands.

The processes to smooth and correct contour lines in the image processing apparatus constituted as mentioned above will now be described on the basis of the algorithm of FIG. 2.

Figure 4:
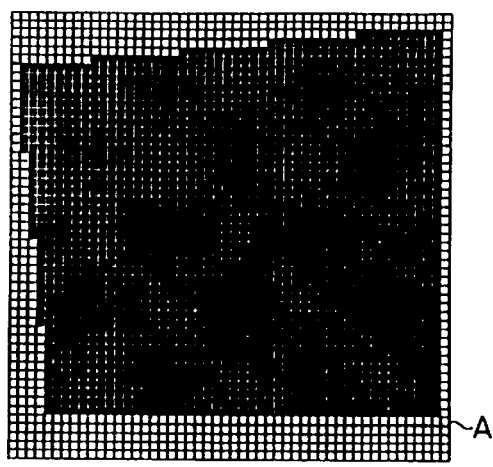
FIG. 4 is a diagram showing a graphic image to be corrected.
Figure 5:
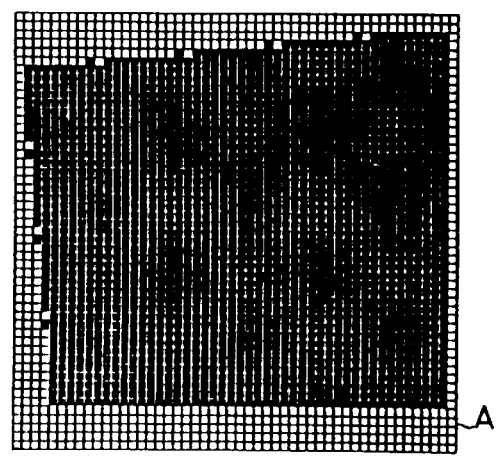
FIG. 5 is a diagram showing a graphic image after correction.

Consider processes for performing a smoothing correction of the notches to a graphic image having stairway-like portions (slant portions) which have once been drawn in a dot plane A in the image memory 5 as shown in FIG. 4, and thereby is subject to smoothing as shown in FIG. 5.

Figure 6:
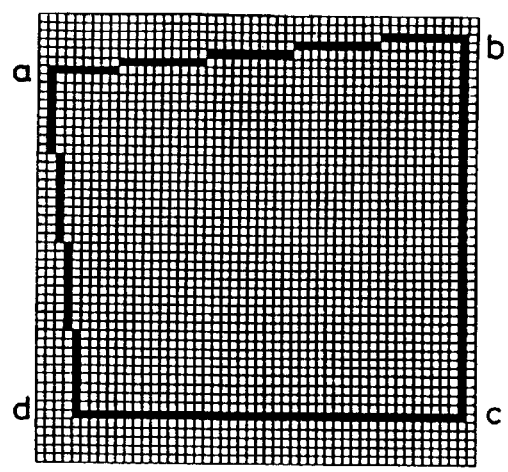
FIG. 6 is a diagram showing contour lines of a graphic image.

First, in the contour lines (FIG. 6) of the graphic image of FIG. 4, the slope of a straight line between points a and b is calculated and set to θ. The correcting process to smooth the slant portions is executed when θ of the lines within a range of $-\Delta \leq \theta \pm \pi/2 \times n \leq \Delta$ (n is an integer) for a predetermined slope α. Capital letters X, Y, X', and Y' assume integer values corresponding to the coordinate values on the dot plane A. A symbol "←" denotes a substituting process to form an integer by rounding to the nearest whole number. In FIG. 6, now assuming that the initial point a is set to $(x_0, y_0)$ and a terminal point b is set to $(x_1, y_1)$ (step S1), in the straight line between the points a and b, $|x_0-x_1|>|y_0-y_1|$ (step S2) and $\tan^{-1}|y_0-y_1|/|x_0-x_1|<\alpha$ (step 3). Therefore, the correcting process for smoothing is executed in accordance with the following procedure. $Y \leftarrow y_0$ and $X \leftarrow x_0$ are executed (step S4). Since $y_0<y_1$, the coordinate values of the next point (X', Y') which is pointed after the present point (X, Y) are obtained by the arithmetic operations $Y' \leftarrow Y+1$ and $X' \leftarrow (x_0-x_1)/(y_0-y_1)(Y-y_0)+x_0$ (steps S5 and S6). When X=X', X←X' and Y←Y' are directly executed (steps S8 and S12). When X≠X' (when a stairway-like change occurred) the bits on the dot plane at the positions (X, Y') and (X', Y') are inverted. In a manner similar to the above, if $|x_0-x_1| \leq |y_0-y_1|$, the processes in steps S14 to S24 are executed. The inversion occurs at points shown in FIG. 10 as mentioned above and a graphic image obtained by performing the smoothing correction to the notches is obtained as shown in FIG. 5.

(Second embodiment)

Figure 3:
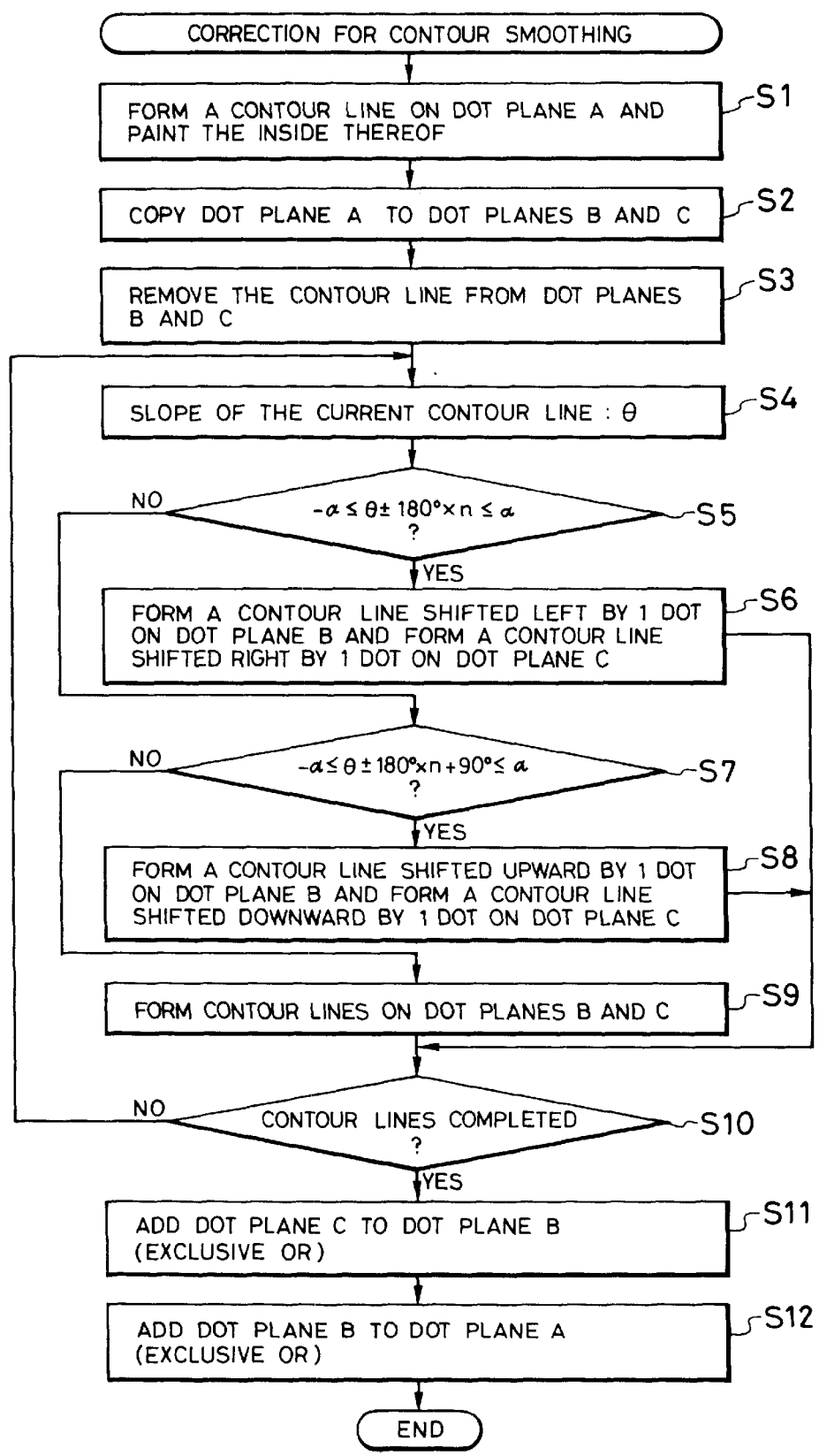
FIG. 3 is a flowchart showing an algorithm for processes to smooth and correct contour lines according to the second embodiment.

Since the construction of an image processing apparatus according to the second embodiment is substantially the same as that of the first embodiment, its detailed description is omitted. In the second embodiment, the correcting processes for smoothing contour lines shown in FIG. 3 are executed. The program for the smoothing processes is stored in the ROM 2 similar to the case of the first embodiment.

In the second embodiment, a consider the processes for performing the smoothing correction of notches of a graphic image having the slant portions which has once been drawn on the dot plane A in the image memory as shown in, e.g., FIG. 4, thereby is subject to smoothing as shown in FIG. 5.

Figure 7:
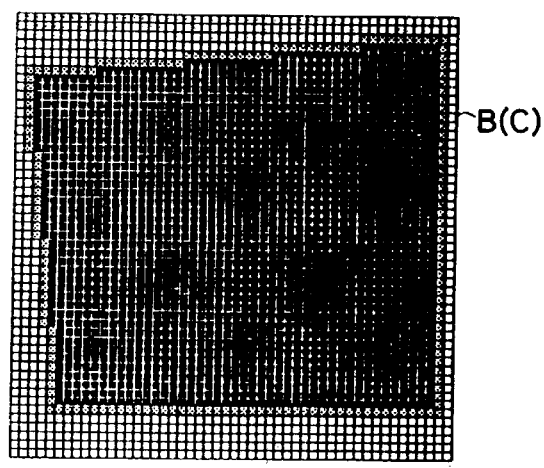
FIG. 7 is a diagram showing a graphic image from which the contour lines were removed.
Figure 8:
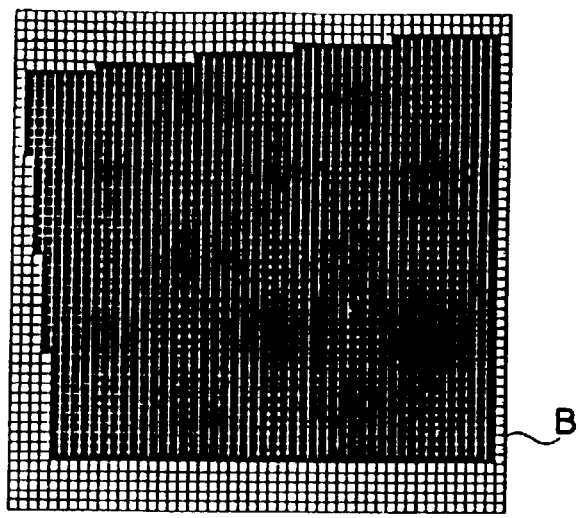
FIG. 8 is a diagram showing a graphic image drawn by shifting the image upward or to the left by one dot.
Figure 9:
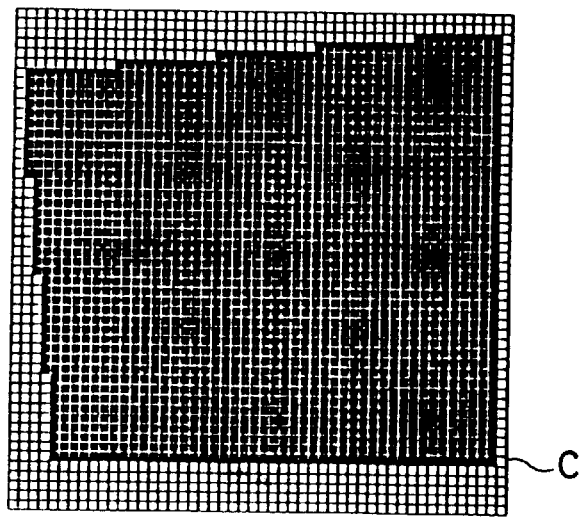
FIG. 9 is a diagram showing a graphic image drawn by shifting the image downward or to the right by one dot.

First, the graphic image of FIG. 4 in which the inside of the contour lines were painted is drawn on the dot plane A in the image memory 5 (step S1). Next, the dot plane A is copied to dot planes B and C (step S2). The contour lines are then removed from the dot planes B and C (step S3). Thus, a graphic image as shown in FIG. 7 is obtained and the following correction is executed to this image, and the resultant contour lines are again drawn. It is now assumed that in the contour lines of the graphic image shown in FIG. 6, the slope of the straight line between the points a and b is calculated and set to θ. When θ falls within a range of $-\alpha<\theta \pm 180° \times n<\alpha$ (n is an integer) for a predetermined slope α, the contour line shifted to the left by one dot is drawn on the dot plane B and the contour line shifted to the right by one dot is drawn on the dot plane C (steps S5 and S6). On the other hand, when $-\alpha<\theta \pm 180° \times n+90°<\alpha$, the contour line shifted upward by one dot is drawn on the dot plane B and the contour line shifted downward by one dot is drawn on the dot plane C (steps S7 and S8). On the other hand, in the case of the other angles, the contour line at the original position is drawn on each of the dot planes B and C (step S9). However, even when the contour line is shifted upward/ downward or to the right/left, the initial point and terminal point of the contour line are made coincident with the positions of the unshifted contour line. The dot plane B is set as shown in FIG. 8. The dot plane C is set as shown in FIG. 9.

Figure 10:
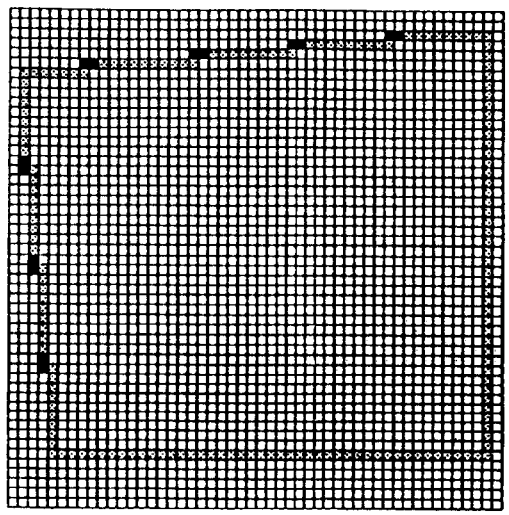
FIG. 10 is a diagram showing a graphic image for correction which is obtained by the processes in FIGS. 7 and 8.

Next, the dot plane C is added to the dot plane B on the basis of an exclusive OR logic operation, so that an image as shown in FIG. 10 is derived (step S11). Next, the dot plane B is added to the dot plane A on the basis of an exclusive OR logic operation, so that an image after the smoothing correction of the notches for the slant portions was performed is derived as shown in FIG. 5 (step S12).

According to the smoothing correction of notches for the slant portions in the foregoing embodiment, only every two dots are corrected when the contour lines are nearer to a horizontal or vertical line than a certain angle. However, it is also possible to correct contour lines as shown in FIG. 11 by preparing a plurality of dot planes for correction of a contour and by changing the amounts of movement in the upward/downward and rightward/ leftward directions in accordance with the degree of slope of the contour line and the resolution of the output apparatus.

As described above, the image processing apparatus according to the invention has an effect such that in an output apparatus, the contour lines having gentle slopes can be visually smoothly output without performing a complicated control operation.

What is claimed is:

1. An image processing apparatus comprising:

memory means for storing digital data representing an image of first dots and second dots, in positions corresponding to respective coordinate positions of a pattern to be output;

first detecting means for detecting, based on coordinate data, an oblique line in a contour line image formed by the first dots stored in said memory means, the oblique line being within a predetermined angle of a horizontal or of a vertical line;

second detecting means for detecting stairway-like change portions of the oblique line detected by said first detecting means by testing corresponding digital data indicative of the oblique line to determine whether that line is continuous or not; and contour line correcting means for correcting two adjacent dots, including one first dot and one second dot, at the stairway-like change portions detected by said second detecting means by overwriting a plurality of the digital data which represent the image, which are adjacent to each other and which are within a predetermined distance of the oblique line portion which is noncontinuous, said contour line correcting means performing such correction by inverting the one first dot and one second dot appearing in the stairway-like change portions, the inversion of dots being performed in such manner that the number of first dots forming the image remains the same after dot inversion as before dot inversion.

2. An apparatus according to claim 1, further comprising display means for displaying the image by displaying dots in correspondence with the coordinate position.

3. An apparatus according to claim 1, further comprising a display for outputting an image based on the corrected dot data.

4. An apparatus according to claim 1, further comprising a printer for outputting an image based on the corrected dot data.

5. An apparatus according to claim 1, wherein the number of first dots forming the image is maintained the same after dot inversion as before dot inversion by inverting black data and white data at the non-continuous point to white data and black data, respectively.

6. An image processing apparatus comprising:

first memory means for storing data representing a straight line, the data comprising initial and terminal points;

second memory means for storing dot data based on the straight line data, the dot data comprising first dot data and second dot data;

operation means for obtaining a slope of the straight line from the straight line data;

detecting means for detecting a non-continuous point in the first dot data stored in said second memory means when the slope of the straight line obtained by said operation means lies between predetermined values; and correcting means for correcting two adjacent first dot data and second dot data at the non-continuous point detected by said detecting means by inverting the two adjacent first dot data and second dot data, the inversion of dots being performed in such manner that the number of first dots forming the image remains the same after dot inversion as before dot inversion.

7. An apparatus according to claim 6, wherein the straight line data represent a contour of a figure.

8. An apparatus according to claim 6, wherein the non-continuous point is a stairway-like shape in the dot data.

9. An apparatus according to claim 6, further comprising a display for outputting an image based on the corrected dot data.

10. An apparatus according to claim 6, further comprising a printer for outputting an image based on the corrected dot data.

11. An apparatus according to claim 6, wherein the number of first dots forming the image is maintained the same after dot inversion as before dot inversion by inverting black data and white data at the non-continuous point to white data and black data, respectively.

12. An image processing method comprising the steps of:

storing data representing a straight line, the data comprising initial and terminal points;

storing dot data based on the stored straight line data, the dot data comprising first dot data and second dot data;

obtaining a slope of the straight line from the stored straight line data;

detecting a non-continuous point in the stored first dot data when the obtained slope of the straight line lies between predetermined values;

correcting means for correcting two adjacent first dot data and second dot data at the detected non-continuous point by inverting the two adjacent first dot data and second dot data; and displaying an image based on the corrected dot data, the inversion of dots being performed in such manner that the number of first dots forming the image remains the same after dot inversion as before dot inversion.

13. A method according to claim 12, wherein said displaying step displays the image on a printer.

14. A method according to claim 12, wherein said displaying step displays the image on a video display.

15. A method according to claim 12, wherein the number of first dots forming the image is maintained the same after dot inversion as before dot inversion by inverting black data and white data at the non-continuous point to white data and black data, respectively.

16. A computer readable medium having recorded thereupon a computer implementable method for image processing comprising the steps of:

storing data representing a straight line, the data comprising initial and terminal points;

storing dot data based on the stored straight line data, the dot data comprising first dot data and second dot data;

obtaining a slope of the straight line from the stored straight line data;

detecting a non-continuous point in the stored first dot data when the obtained slope of the straight line lies between predetermined values;

correcting means for correcting two adjacent first dot data and second dot data at the detected non-continuous point by inverting the two adjacent first dot data and second dot data; and displaying an image based on the corrected dot data, the inversion of dots being performed in such manner that the number of first dots forming the image remains the same after dot inversion as before dot inversion.

17. A computer-usable medium according to claim 16, wherein said displaying step displays the image on a printer.

18. A computer-usable medium according to claim 16, wherein said displaying step displays the image on a video display.

19. A computer-usable medium according to claim 16, wherein the number of first dots forming the image is maintained the same after dot inversion as before dot inversion by inverting black data and white data at the non-continuous point to white data and black data, respectively.

* * * * *

UNITED STATES PATENT AND TRADEMARK OFFICE
CERTIFICATE OF CORRECTION

PATENT NO. : 5,838,298

DATED : November 17, 1998

INVENTOR(S) : AKIFUMI SHIRASAKA

It is certified that error appears in the above-identified patent and that said Letters Patent is hereby corrected as shown below:

[57] ABSTRACT

Line 6, "memory a" should read --memory; a--.

COLUMN 1

Line 21, "employ," should read --employ--.
　Line 27, "the" should be deleted.
　Line 29, "use" should read --used--.

COLUMN 2

Figure 11A:
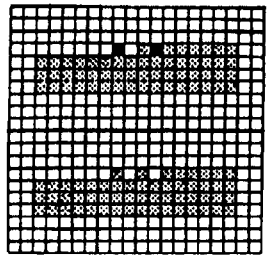
FIG. 11(a) to 11(f) are diagrams showing other graphic images for correction.
Figure 11B:
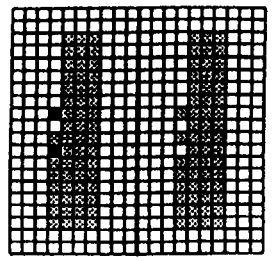
Figure 11C:
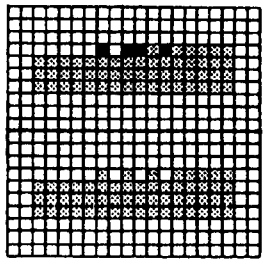
Figure 11D:
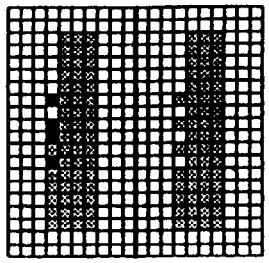
Figure 11E:
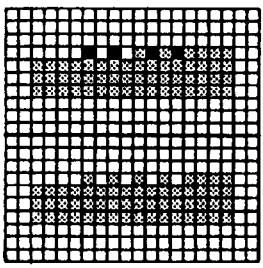
Figure 11F:
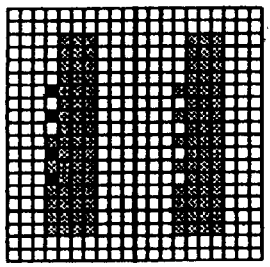
Figure 12A:
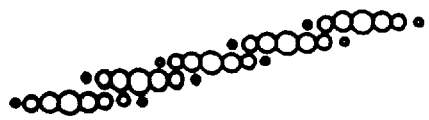
FIG. 12(a) and 12(b) are diagrams showing example of an output for smoothing in a conventional apparatus.
Figure 12B:
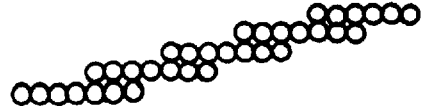

Line 17, "FIG. 11(a)" should read --FIGS. 11(a)--.
　Line 19, "FIG. 12(a)" should read --FIGS. 12(a)--.

COLUMN 3

Line 3, "$-\Delta \leq \pm\theta\pi/2xn \leq \Delta$" should read -- $-\alpha \leq \theta \pm \pi/2xn \leq \alpha$--.
　Line 10, "(step 3)." should read --(step S3).--.
　Line 19, "occurred)" should read --occurs)--.
　Line 34, "a" should be deleted.

UNITED STATES PATENT AND TRADEMARK OFFICE
CERTIFICATE OF CORRECTION

PATENT NO. : 5,838,298

DATED : November 17, 1998

INVENTOR(S) : AKIFUMI SHIRASAKA

It is certified that error appears in the above-identified patent and that said Letters Patent is hereby corrected as shown below:

<u>COLUMN 6</u>

Line 35, "computer-useable" should read
      --computer-readable--.
    Line 37, "computer-useable" should read
      --computer-readable--.
    Line 40, "computer-useable" should read
      --computer-readable--.

Signed and Sealed this

Fourth Day of January, 2000

Attest:

Attesting Officer     *Acting Commissioner of Patents and Trademarks*